United States Patent [19]

Krämer

[11] 4,399,068
[45] Aug. 16, 1983

[54] CONCENTRATED, AQUEOUS SOLUTIONS OF SALTS OF ACETOACETYLAMINO-ARYLSULPHONIC ACIDS AND METHOD OF FORMING CONCENTRATED SOLUTIONS OF AZO DYESTUFFS THEREFROM

[75] Inventor: Erich Krämer, Berg.-Gladbach, Fed. Rep. of Germany

[73] Assignee: Bayer Aktiengesellschaft, Leverkusen, Fed. Rep. of Germany

[21] Appl. No.: 870,602

[22] Filed: Jan. 18, 1978

[30] Foreign Application Priority Data

Jan. 22, 1977 [DE] Fed. Rep. of Germany ....... 2702584

[51] Int. Cl.³ .................. C09B 29/036; C09B 29/039; C09B 29/33; C09B 44/02
[52] U.S. Cl. ........................ 260/158; 8/574; 8/585; 8/586; 8/611; 8/609; 260/152; 260/156; 260/157; 260/176; 260/193; 260/501.12; 260/501.15; 260/501.21
[58] Field of Search ............... 260/158, 157, 193, 176, 260/501.12, 501.15, 501.21, 152, 156; 8/609, 611, 586, 585, 574

[56] References Cited

U.S. PATENT DOCUMENTS

| | | | |
|---|---|---|---|
| 2,310,181 | 2/1943 | Mackenzie | 260/193 |
| 3,274,171 | 9/1966 | Anderson et al. | 260/158 |
| 3,313,665 | 4/1967 | Caldwell et al. | 260/79.3 |
| 3,925,375 | 12/1975 | Lamberti | 260/501.15 X |
| 4,001,206 | 1/1977 | Schoefberger | 260/158 |
| 4,014,926 | 3/1977 | Dear et al. | 260/513 N |

*Primary Examiner*—Floyd D. Higel
*Attorney, Agent, or Firm*—Sprung, Horn, Kramer & Woods

[57] ABSTRACT

Salts of acetoacetylamino-arylsulphonic acids, of the formula

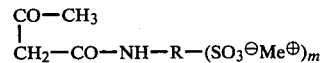

wherein
R denotes an optionally substituted benzene or naphthalene nucleus,
Me denotes a protonated, tertiary, hydrophilizing nitrogen base or the lithium cation and
m denotes 1,2 or 3 are easily obtained by reacting compounds of the formula

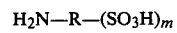

wherein R and m have the above mentioned meaning, with diketene in an aqueous or aqueous-organic solvent maintaining a pH>3 during the reaction by adding tertiary, hydrophilizing nitrogen bases or a basic lithium salt.

The salts can be obtained as concentrated solutions which are easily reacted with diazotized aromatic amines to concentrated solutions of azo dyestuffs.

4 Claims, No Drawings

CONCENTRATED, AQUEOUS SOLUTIONS OF SALTS OF ACETOACETYLAMINO-ARYLSULPHONIC ACIDS AND METHOD OF FORMING CONCENTRATED SOLUTIONS OF AZO DYESTUFFS THEREFROM

The invention relates to concentrated solutions of salts of acetoacetylamino-arylsulphonic acids, the preparation of these solutions and the use of these solutions for preparing concentrated solutions of anionic azo dyestuffs.

The salts of acetoacetylamino-arylsulphonic acids correspond to the formula $$\begin{array}{l} CO-CH_3 \\ | \\ CH_2-CO-NH-R-(SO_3^\ominus Me^\oplus)_m \end{array} \quad (I)$$

in which
R denotes an optionally substituted benzene or naphthalene nucleus,
Me denotes a protonated, tertiary, hydrophilising nitrogen base, a quaternary, hydrophilising ammonium cation or the lithium cation and
m denotes 1, 2 or 3.

Suitable tertiary, hydrophilising nitrogen bases are preferably those of the formula $$\begin{array}{c} R_1-N-R_3 \\ | \\ R_2 \end{array} \quad (II)$$

wherein
$R_1$ denotes hydroxyalkyl, alkoxyalkyl or a radical of the formula $$-(C_2H_4O)_n-R_4$$

$R_2$ and $R_3$ denote alkyl, hydroxyalkyl, alkoxyalkyl or a radical of the formula $$-(C_2H_4O)_n-R_4$$

or, together with the N atom, form a saturated 5-membered or 6-membered heterocyclic ring,
$R_4$ denotes hydrogen or alkyl and
n denotes an integer 2 to 10.

Suitable quaternary, hydrophilising ammonium cations are preferably those of the formula $$\begin{bmatrix} R_5 \\ | \\ R_1-N-R_3 \\ | \\ R_2 \end{bmatrix}^\oplus \quad (IIa)$$

wherein
$R_1$, $R_2$ and $R_3$ have the meaning already indicated and $R_5$ has the meaning of $R_2$ or $R_3$.

Suitable heterocyclic rings are pyrrolidine, piperidine, morpholine or piperazine.

Within the formula (II) and (IIa), those compounds in which the alkyl and alkoxy radicals mentioned contain 1 to 4 C atoms are preferred.

Examples which may be mentioned: triethanolamine, tris-[2-(2-hydroxyethoxy)-ethyl]-amine, tris-propanolamine or tris-isopropanolamine, dimethylethanolamine or diethylethanolamine, N-hydroxyethylpiperidine or N-hydroxyethylmorpholine.

Suitable quaternary ammonium bases are, for example, trimethyl-(2-hydroxyethyl)-, dimethyl-bis-(2-hydroxyethyl)-, methyl-tris-(2-hydroxyethyl)- or tetra-(2-hydroxyethyl)ammonium hydroxide.

Lithium hydroxide, carbonate or bicarbonate are advantageously employed as the basic lithium salts.

Possible substituents of the benzene and naphthalene nuclei are halogen atoms, such as fluorine, chlorine and bromine, $C_1-C_4$-alkyl radicals, $C_1-C_4$-alkoxy radicals and acylamino groups, in particular $C_1-C_4$-alkylcarbonylamino, and $C_1-C_4$-alkylsulphonylamino, as well as phenylazo and naphthylazo groups, which can be substituted by methyl, methoxy, chlorine or nitro.

Benzene nuclei which are not substituted or are further substituted by chlorine, acetylamino, carboxycarbonylamino, methyl, methoxy, phenylazo or naphthylazo, or naphthalene nuclei which are not substituted or are substituted by phenylazo groups, it being possible for phenylazo and naphthylazo to be substituted by methyl, methoxy, chlorine or nitro, are particularly preferred.

The compounds according to the invention are obtained by a process in which compounds of the formula $$H_2N-R-(SO_3H)_m \quad (III)$$

wherein
R and m have the meaning already given,
are reacted with diketene in an aqueous or aqueous-organic solvent, and a pH >3, preferably of 4 to 5, is maintained during the reaction by adding amines of the formula $$\begin{array}{c} R_1-N-R_3 \\ | \\ R_2 \end{array} \quad (II)$$

wherein
$R_1$, $R_2$ and $R_3$ have the abovementioned meaning,
or by adding ammonium hydroxides containing the cation of the formula $$\begin{bmatrix} R_5 \\ | \\ R_1-N-R_3 \\ | \\ R_2 \end{bmatrix} \quad (IIa)$$

in which
$R_1$, $R_2$, $R_3$ and $R_5$ have the abovementioned meaning, or by adding a basic lithium salt.

Suitable compounds of the formula (III) are, for example, aniline-2-, -3- and -4-sulphonic acid, aniline-2,5-, -2,4- and -3,5-disulphonic acid, 4- and 5-chloroaniline-2-sulphonic acid, 4,5-dichloroaniline-2-sulphonic acid, 4- and 6-chloroaniline-3-sulphonic acid, 2-chloroaniline-4-sulphonic acid, 2,5-dichloroaniline-4-sulphonic acid, 5- and 4-acetylaminoaniline-2-sulphonic acid, 4-carboxycarbonylaminoaniline-3-sulphonic acid, 4-methylaniline-3-sulphonic acid, 3-methylaniline-4-sulphonic acid, 2-methylaniline-4sulphonic acid, 2-methylaniline-5-sulphonic acid, 2-methyl-6-chloroaniline-3-sulphonic acid, 4-methoxy- and -ethoxy-aniline-3-sulphonic acid, 4-methoxyaniline-2-sulphonic acid, 2-methoxyaniline-5- sulphonic acid, 2-, 4-, 5-, 6-, 7- and 8-aminonaphthalene-1-sulphonic acid, 1-, 4-, 5-, 6-, 7- and 8-aminonaphthalene-2-sulphonic acid, 4-, 5-, 6-, 7- and 8-aminonaphthalene-1,3-disulphonic acid, 3-aminonaphthalene-1,5-disulphonic acid, 4-aminonaphthalene-1,6-disulphonic acid, -1,7-disulphonic acid, -2,6-disulphonic acid and -2,7-disulphonic acid, 7-aminonaphthalene-1,3,5-trisulphonic acid, 1-amino-2-ethoxynaphthalene-6-sulphonic acid, 4'-aminoazobenzene-4-sulphonic acid, 4'-amino-3'-methoxyazobenzene-3 and -4-sulphonic acid, 4'-amino-2'-methylazobenzene-3- and -4-sulphonic acid, 2-[(4-amino-2-methyl-1-phenyl)-azo]-naphthalene-4,8-disulphonic acid and 1-amino-4-[(3-sulphophenyl)-azo]-naphthalene.

The solutions, according to the invention, of the compounds of the formula (I) are outstandingly suitable for the preparation of concentrated solutions of azo dyestuffs, containing sulphonic acid groups, in the form of their salts with the amines of the formula (II) or in the form of their salts with the cation of the formula (IIa).

Concentrated dyestuff solutions have hitherto been prepared by a process in which the free dyestuff acid was isolated, any interfering ions were removed with dyestuff acids were dissolved in a suitable solvent with suitable bases. However, the preparation of the dyestuff acids from the sodium salts of the dyestuff, which are customarily obtained, is expensive and time-consuming and usually cannot be carried out to completion. A further route for the preparation of concentrated dyestuff solutions consisted of a process in which the ions having an adverse influence on the solubility were removed by precipitation and replaced by more favourable ions, which entailed an increased expenditure of work.

It is possible, by the process according to the invention, to prepare concentrated dyestuff solutions in the most simple manner.

In particular, there are particular advantages in the case of the preparation of azo dyestuffs of the formula

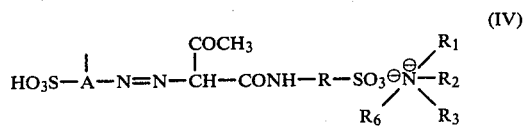

wherein
R, $R_1$, $R_2$ and $R_3$ have the abovementioned meaning,
$R_6$ denotes $R_2$, $R_3$ or hydrogen and
A' denotes the radical of a diazo component which is free from further sulphonic acid groups,
since on the one hand the required compounds of the formula (III) (m=1) are in this case generally present in the form of a betaine, that is to say free from foreign ions, and can be reacted with diketene, with the addition of amines of the formula (II) or of ammonium hydroxides containing the cation of the formula (IIa), and on the other hand, by diazotising the diazo components of the formula

    (V)

diazonium betaines of the formula

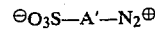    (VI)

wherein
A' has the abovementioned meaning, are obtained which, as is known, are sparingly soluble and tan therefore be easily isolated and, because of their stability at room temperature, are essentially not dangerous to handle. Thus, any sodium ions entrained during the diazotisation with sodium nitrite can be removed by isolating the diazonium betaine. Concentrated dyestuff solutions which are virtually free from foreign ions are accordingly obtained in the preparation of the dyestuffs of the formula (IV).

Suitable diazo components are, for example, 4'-aminoazobenzene-4-sulphonic acid, 4'-amino-3'-methoxyazobenzene-3-sulphonic acid, 6-methyl-2-(4-aminophenyl)-benzthiazole-7-sulphonic acid, 6-methyl-2-(4-amino-3-sulphophenyl)-benzthiazole, 2-(4-aminophenyl)-naphtho[1,2:d)]-triazole-6-sulphonic acid, 6-methyl-2-(-4-amino-3-sulphophenyl)-benzthiazole-7-sulphonic acid, 2-(4-amino-3-sulphophenyl)-4,7-disulphonaphtho[1,2:d]-triazole and 4-amino-4-(sulphonaphtho[1,2-d]triazol-2-yl)-stilbene-2,2'-disulphonic acid.

Further suitable diazo components are described in DT-OS (German Published Specification) 2,126,299 and in U.S. Pat. No. 3,186,980.

Suitable organic solvents for the process are, for example, polyols and their monoalkyl ethers or dialkyl ethers, amides of lower carboxylic acids and mixtures of the solvents mentioned. Examples which may be mentioned are ethylene glycol, diethylene glycol, ethylene glycol monomethyl ether and monoethyl ether, diethylene glycol monomethyl ether and monoethyl ether and the corresponding dimethyl ethers and diethyl ethers, acid amides, such as formamide, dimethylformamide, pyrrolidone, N-methylpyrrolidone and urea.

EXAMPLE 1

61 g (0.3 mol) of 3-amino-4-methoxybenzenesulphonic acid are stirred in 170 ml of water. 28 g of diketene are added dropwise in the course of 2 to 3 hours and the pH is kept at 3 by adding 84 g of tris-[2(2-hydroxyethoxy)ethyl]amine dropwise. The suspended starting compound disappears slowly with the formation of an about 27% strength solution (relative to free acid), which is free from foreign ions, of the coupling component of the formula

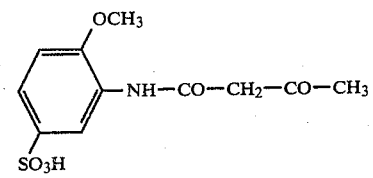

EXAMPLE 2

If triethanolamine, triisopropanolamine or mixtures of these bases are used as the tertiary nitrogen base and the procedure followed is otherwise as in Example 1, concentrated solutions of 3-acetoacetylamino-4-methoxy-benzenesulphonic acid are correspondingly obtained.

EXAMPLE 3

96 g (0.3 mol) of 6-methyl-2-(aminophenyl)-benzthiazole-7-sulphonic acid are diazotised in the customary manner and the diazonium betaine which precipitates is isolated. About 230 g of a paste are obtained. This is stirred in 400 ml of water and combined with the solution obtained according to Example 1.

The pH is adjusted to 4 to 4.5 with about 85 g of tris[2(2-hydroxyethoxy)ethyl]-amine, and this value is maintained until the coupling reaction has ended. The temperature of the reaction mixture is kept below 15° C. by cooling. About 1,060 g of a greenish-tinged yellow, stable dyestuff solution are obtained, which contains about 17% (relative to free acid) of the dyestuff of the formula

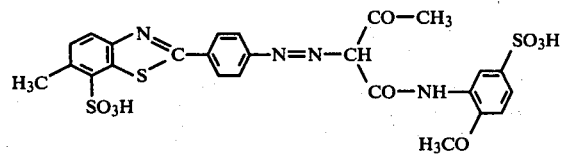

and can be used for dyeing paper and cotton.

EXAMPLE 4

83.2 g (0.3 mol) of 4-aminoazobenzene-4'-sulphonic acid are diazotised in the customary manner. The diazonium betaine which has precipitated is isolated. About 180 g of a paste are obtained, which is introduced into the solution obtained according to Example 1, and the mixture is stirred. The pH is adjusted to 4 to 4.5 with about 48 g of triethanolamine and this value is maintained until the reaction has ended. The temperature is kept below 20° C. by external cooling. About 570 g of a stable yellow solution are obtained, which contains about 30% (relative to free acid) of the dyestuff of the formula

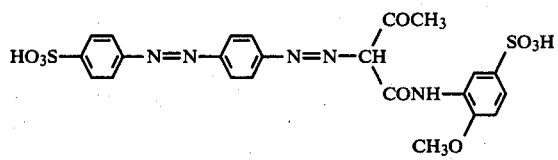

It can be used for dyeing Perlon and paper.

EXAMPLE 5

150 g (0.3 mol) of the triazole of the formula

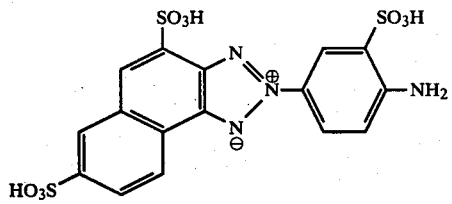

are stirred in 500 ml of water and 40 ml of hydrochloric acid (19.5° Bé). The triazole is diazotised with 20.7 g of sodium nitrite, dissolved in 65 ml of water, in the course of one hour and the mixture is allowed to after-react for a further hour in the presence of excess nitrous acid. After the nitrous acid has been destroyed with amidosulphonic acid, the diazotised compound is isolated. About 250 g of a paste are obtained. It is introduced into the solution obtained according to Example 1 and the mixture is stirred. The pH is adjusted to 4 to 4.5 with about 67 g of triethanolamine, and this value is maintained until the coupling reaction has ended. The temperature of the reaction mixture is kept below 20° C. by cooling. The diazotised paste is not free from Na ions. The stability of the finished dyestuff solution is improved by adding 63.5 g (0.15 mol) of H2SiF6 (34% strength) and 31.5 g (0.3 mol) of an equimolar mixture of ethanolamine, diethanolamine and triethanolamine. After stirring for 3 hours, the solution is clarified by filtering off the Na2SiF6 which has precipitated. About 730 g of a solution are obtained, which contains about 33% (relative to free acid) of the dyestuff of the formula

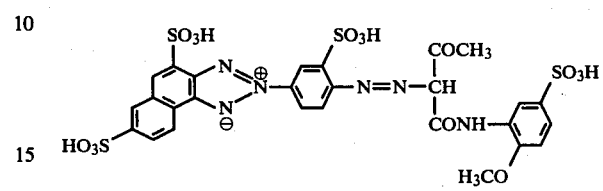

The solution is employed for dyeing paper.

EXAMPLE 6

Analogously to Example 1, 52 g (0.3 mol) of aniline-4-sulphonic acid in the amount of water indicated are reacted with diketene in the presence of tris-[2(2-hydroxyethoxy)ethyl]amine. A concentrated solution, which contains few foreign ions, of the coupling component of the formula

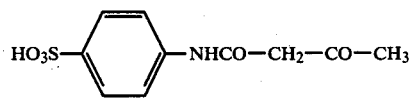

is obtained.

EXAMPLE 7

If the solution obtained according to Example 6 is reacted, analogously to Example 3 to 5, with the diazo components and bases indicated there, the corresponding yellow dyestuffs are obtained in the form of stable, concentrated solutions which contain few foreign ions.

EXAMPLE 8

73.5 g (0.3 mol) of 1-naphthylamine-4-sulphonic acid are stirred in 250 ml of water. 35 g of diketene are added dropwise in the course of 3 hours and the pH is kept at 3 by adding 90 g of tris-[-2(2-hydroxyethoxy)-ethyl]-amine dropwise.

A solution, which is free from foreign ions, of 4-acetoacetylaminonaphthalene-1-sulphonic acid is obtained. If the diazonium betaine isolated according to Example 3 is added and a coupling reaction is carried out analogously to Example 3 by adding tris-[2(2-hydroxyethoxy)ethyl]-amine dropwise, a stable solution of the dyestuff of the formula

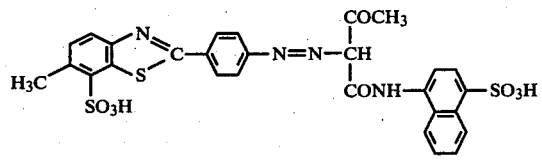

is obtained.

EXAMPLE 9

91 g (0.3 mol) of 2-naphthylamine-5,7-disulphonic acid are stirred in 200 ml of water. 35 g of diketene are added dropwise at pH 3 in the course of 3 hours, whilst buffering with 95 g of triethanolamine. The solution of the resulting coupling component is reacted with the diazonium betaine isolated according to Example 3 by adding tris-[2(2-hydroxyethoxy)-ethyl]-amine dropwise. A stable solution of the dyestuff of the formula

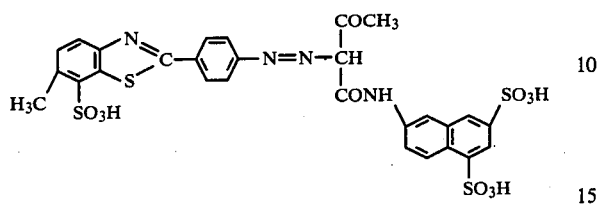

is obtained.

EXAMPLE 10

The diazonium betaine isolated according to Example 3 is stirred in the solution of the coupling component prepared according to Example 1 and 150 g of diethylene glycol are added. The coupling reaction is carried out as in Example 3. Under the action of the organic solvent, about 800 g of a stable, about 23% strength solution (relative to free acid) of the same dyestuff as in Example 3 are obtained.

EXAMPLE 11

92.1 g (0.3 mol) of 4'-amino-3'-methoxyazobenzene-3-sulphonic acid are stirred in 300 ml of water. 30 g of diketene are added dropwise in the course of 3-4 hours and the pH is kept at 3.5 by adding 90 g of tris-[2(2-hydroxyethoxy)ethyl]-amine dropwise. The suspended starting compound disappears slowly, with the formation of an about 23% strength solution (relative to free acid), which is free from foreign ions, of the coupling component formula

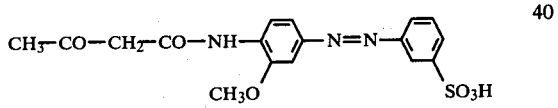

The diazonium betaine isolated according to Example 3 and stirred with 300 ml of water, are introduced into the solution and the solution is buffered at pH 4 with about 85 g of tris-[2(2-hydroxyethoxy)-ethyl]-amine. (Temperature 15°-20° C.). About 1,130 g of a yellow, stable dyestuff solution are obtained, which contains about 18% (relative to free acid) of the dyestuff of the formula

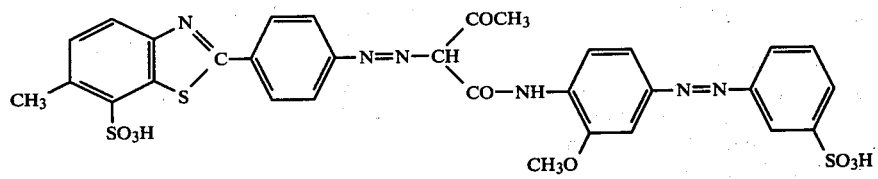

and can be used for dyeing paper and cotton.

I claim:

1. Process for the preparation of a concentrated dyestuff solution substantially free from foreign ions comprising (a) reacting a compound of the formula

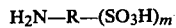

wherein

R is benzene or naphthalene unsubstituted or substituted with fluorine, chlorine, bromine, $C_1$-$C_4$-alkyl, $C_1$-$C_4$-alkoxy, $C_1$-$C_4$-alkylcarbonylamino, $C_1$-$C_4$-alkylsulphonylamino, phenylazo, naphthylazo, or phenylazo or naphthlazo substituted by methyl, methoxy, chloride, or nitro or is benzene substituted with carboxylcarbonylamino; and m is 1, 2 or 3;

with diketene in an aqueous or aqueous-organic solvent while maintaining a reaction pH>3 by adding an amine of the formula

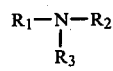

wherein $R_1$ is hydroxyalkyl, alkoxyalkyl or —$(C_2H_4O)_n$—$R_4$;

$R_2$ and $R_3$ are alkyl, hydroxyalkyl, alkoxyalkyl or —$(C_2H_4O)_n$—$R_4$, or, together with the N atom, are pyrrolidine, morpholine, or piperazine;

or by adding an ammonium hydroxide containing a cation of the formula

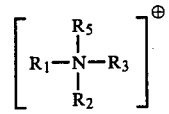

wherein $R_1$, $R_2$ and $R_3$ are as defined above and $R_5$ is $R_2$ or $R_3$, to form a concentrated salt solution substantially free from foreign ions of the coupling component of the formula

wherein Me is

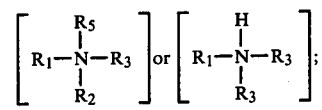

(b) reacting the resultant concentrated salt solution with a diazotized amine of the formula

wherein A is the radical of a diazo component to form a concentrated solution of the corresponding azo dyestuff.

2. The process of claim 1, wherein m is one, the pH of the reaction is maintained by adding the amine or the ammonium hydroxide and the resulting concentrated solution of the coupling component is reacted with a diazonium betaine of the formula

wherein A is the radical of a diazo component, to form a concentrated solution of the corresponding azo dyestuff.

3. A concentrated solution of the dyestuff of the formula

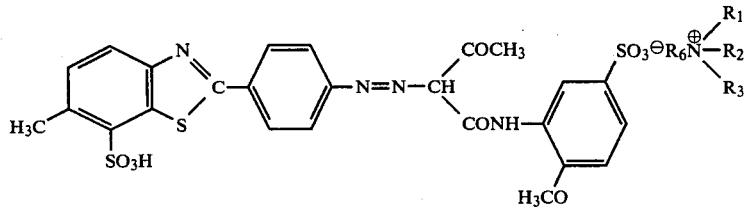

prepared according to claim 1,
wherein
R$_6$ is R$_2$, R$_3$ or hydrogen.

4. A concentrated solution according to claim 3 wherein the solvent is water.

* * * * *